(12) United States Patent
Shimakawa

(10) Patent No.: US 12,298,571 B2
(45) Date of Patent: May 13, 2025

(54) OPTICAL FIBER BUNDLE STRUCTURE, OPTICAL CONNECTION STRUCTURE, AND METHOD OF MANUFACTURING OPTICAL FIBER BUNDLE

(71) Applicant: SUMITOMO ELECTRIC INDUSTRIES, LTD., Osaka (JP)

(72) Inventor: Osamu Shimakawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 199 days.

(21) Appl. No.: 17/984,576

(22) Filed: Nov. 10, 2022

(65) Prior Publication Data

US 2023/0176300 A1  Jun. 8, 2023

(51) Int. Cl.
*G02B 6/40* (2006.01)
*G02B 6/02* (2006.01)
*G02B 6/38* (2006.01)

(52) U.S. Cl.
CPC ......... *G02B 6/403* (2013.01); *G02B 6/02042* (2013.01); *G02B 6/3833* (2013.01)

(58) Field of Classification Search
CPC ... G02B 6/403; G02B 6/02042; G02B 6/3833
See application file for complete search history.

(56) References Cited

U.S. PATENT DOCUMENTS

| 3,912,362 | A  | 10/1975 | Hudson |
| 2008/0069502 | A1 | 3/2008  | Ma     |
| 2010/0166373 | A1 | 7/2010  | Nakanishi et al. |
| 2013/0272668 | A1 | 10/2013 | Sato et al. |
| 2014/0010501 | A1* | 1/2014 | Saito ............... G02B 6/2551 156/182 |
| 2021/0041637 | A1 | 2/2021 | Morishima |

FOREIGN PATENT DOCUMENTS

| EP | 2 330 447 A1 | 6/2011 |
| JP | 2006-201294 A | 8/2006 |
| JP | 2011-107672 A | 6/2011 |
| JP | 2013-68891 A | 4/2013 |
| JP | 2017-181791 A | 10/2017 |
| WO | 2009/104724 A1 | 8/2009 |
| WO | 2013/005779 A1 | 1/2013 |
| WO | 2020/145011 A1 | 7/2020 |

* cited by examiner

*Primary Examiner* — Sung H Pak
(74) *Attorney, Agent, or Firm* — Oliff PLC

(57) ABSTRACT

A plurality of optical fibers are kept in a fiber accommodating portion. In each of the optical fibers, a second diameter portion has a diameter larger than that of a first diameter portion. A second accommodating portion of the fiber accommodating portion has an inner diameter larger than that of a first accommodating portion of the fiber accommodating portion. An inner diameter transition portion of the fiber accommodating portion locates between the first accommodating portion and the second accommodating portion through a tapered surface. The first diameter portion of each of the optical fibers is located in the first accommodating portion, in the inner diameter transition portion, and in the second accommodating portion. Each of the optical fibers is separated from an inner surface of the ferrule in the inner diameter transition portion.

8 Claims, 11 Drawing Sheets

OPTICAL FIBER BUNDLE STRUCTURE, OPTICAL CONNECTION STRUCTURE, AND METHOD OF MANUFACTURING OPTICAL FIBER BUNDLE

TECHNICAL FIELD

The present disclosure relates to an optical fiber bundle structure, an optical connection structure, and a method of manufacturing an optical fiber bundle.

BACKGROUND

United States Patent Application Publication No. 2008/0069502 discloses an optical fiber bundle structure including a ferrule and a plurality of optical fibers kept in a fiber accommodating portion of the ferrule. Each of the optical fibers includes a first diameter portion and a second diameter portion having a diameter larger than that of the first diameter portion. The fiber accommodating portion includes a first accommodating portion and a second accommodating portion having an inner diameter larger than that of the first accommodating portion. The first diameter portion of each of the optical fibers is kept in the first accommodating portion.

In the optical fiber bundle structure disclosed in US2008/0069502 A1, the plurality of optical fibers are kept in the first accommodating portion having the inner diameter smaller than that of the second accommodating portion. In such a configuration, there is a case where the optical fibers are in contact with an inner surface of the ferrule and are curved at a connection portion between the first accommodating portion and the second accommodating portion. When the optical fibers are curved with a small radius, transmission loss increases. Particularly, in the first diameter portion whose diameter of the optical fiber is smaller than in the second diameter portion, a diameter of a cladding is also smaller than in the second diameter portion, and when a fiber is curved, light is more likely to leak from a core. Further, in the described structure above, in manufacturing steps, the optical fibers may break due to stress caused by the curve in the fiber accommodating portion. A structure that reduces bending loss and breakage risk in the optical fibers, yield and production throughput is desired. U.S. Pat. No. 3,912,362, JP2013-68891A, and JP2017-181791A disclose other examples of the optical fiber bundle structure.

SUMMARY

An object of the present disclosure is to provide an optical fiber bundle structure and an optical connection structure that can improve their yield and production throughput while having a desirable performance, and a method of manufacturing an optical fiber bundle with low loss and no breakage of optical fibers.

An optical fiber bundle structure according to the present disclosure includes: a ferrule; and a plurality of optical fibers. The ferrule includes a fiber accommodating portion. The fiber accommodating portion is formed as a hollow shape with a circular in cross-section, and extends in a first direction. The plurality of optical fibers are kept in the fiber accommodating portion. Each of the optical fibers includes a first diameter portion and a second diameter portion. The second diameter portion has a diameter larger than that of the first diameter portion. The fiber accommodating portion includes a first accommodating portion, a second accommodating portion, and an inner diameter transition portion. The second accommodating portion has an inner diameter larger than an inner diameter of the first accommodating portion. The inner diameter transition portion locates between the first accommodating portion and the second accommodating portion through a tapered surface. The first diameter portion of each of the optical fibers is located in the first accommodating portion, in the inner diameter transition portion, and in the second accommodating portion. Each of the optical fibers is separated from an inner surface of the ferrule in the inner diameter transition portion.

An optical connection structure according to the present disclosure includes: the optical fiber bundle; and a multicore fiber. The multicore fiber includes a plurality of cores extending in the first direction, and a cladding covering the plurality of cores. At least one of the plurality of cores included in the multicore fiber and at least one core of the plurality of optical fibers are optically coupled to each other.

A method of manufacturing an optical fiber bundle according to the present disclosure includes: preparing a ferrule and a plurality of optical fibers; inserting the plurality of optical fibers into the ferrule; and pulling the plurality of optical fibers back in an opposite direction in which the plurality of optical fibers are inserted. The ferrule is formed as a hollow shape with a circular in cross-section, and extends in a first direction. The ferrule includes a fiber accommodating portion. The fiber accommodating portion includes a first accommodating portion, a second accommodating portion, and an inner diameter transition portion. The second accommodating portion has an inner diameter larger than that of the first accommodating portion. The inner diameter transition portion locates between the first accommodating portion and the second accommodating portion through a tapered surface. Each of the optical fibers includes a first diameter portion and a second diameter portion. The second diameter portion has a diameter larger than that of the first diameter portion. The plurality of optical fibers are inserted into the ferrule such that the first diameter portions of the plurality of optical fibers are inserted into the first accommodating portion. After the plurality of optical fibers are inserted into the ferrule, while maintaining a state where the plurality of optical fibers are located in the first accommodating portion, the plurality of optical fibers are pulled back in the opposite direction in which the plurality of optical fibers are inserted.

According to the present disclosure, it is possible to provide the optical fiber bundle structure and the optical connection structure that can improve their yield and production throughput while having desirable performance, and the method of manufacturing an optical fiber bundle with low loss and no breakage of the optical fibers.

DETAILED DESCRIPTION

Description of Embodiment of Present Disclosure

Figure 1:
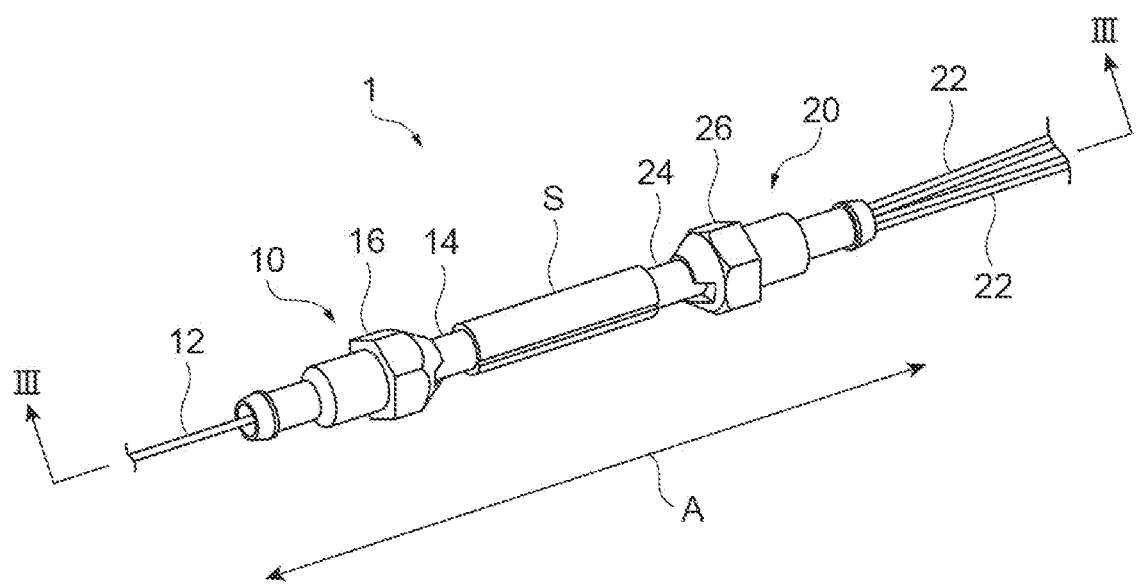
FIG. 1 is a perspective view illustrating an optical connection structure according to an embodiment.

Initially, an embodiment of the present disclosure will be listed and described.

An optical fiber bundle structure according to an embodiment of the present disclosure includes: a ferrule; and a plurality of optical fibers. The ferrule includes a fiber accommodating portion. The fiber accommodating portion is formed as a hollow shape with a circular in cross-section, and extends in a first direction. The plurality of optical fibers are kept in the fiber accommodating portion. Each of the optical fibers includes a first diameter portion and a second diameter portion. The second diameter portion has a diameter larger than that of the first diameter portion. The fiber accommodating portion includes a first accommodating portion, a second accommodating portion, and an inner diameter transition portion. The second accommodating portion has an inner diameter larger than that of the first accommodating portion. The inner diameter transition portion locates between the first accommodating portion and the second accommodating portion through a tapered surface. The first diameter portion of each of the optical fibers is located in the first accommodating portion, in the inner diameter transition portion, and in the second accommodating portion. Each of the optical fibers is separated from an inner surface of the ferrule in the inner diameter transition portion.

In the configuration of the optical fiber bundle, the first diameter portion is located in the first accommodating portion, the inner diameter transition portion, and the second accommodating portion, and each of the optical fibers is separated from the inner surface of the ferrule in the inner diameter transition portion. According to such a structure, the curvature of the optical fibers is reduced, and the bending loss and the breakage risk of the optical fibers are reduced as well. Therefore, bending loss in the optical fiber bundle can be reduced, and yield and production throughput can be improved while providing desirable performance.

As one embodiment of the optical fiber bundle structure, each of the optical fibers may be configured to have an optical loss of 0.15 dB or less when light having a wavelength of 1.550 µm enters into the optical fibers having one turn with a radius of 5 mm or less. In this case, bending loss in the plurality of optical fibers can be suppressed more.

As one embodiment of the optical fiber bundle structure, each of the optical fibers may be configured to have an optical loss of 0.45 dB or less when light having a wavelength of 1.625 µm enters into the optical fibers having one turn with a radius of 5 mm or less. In this case, bending loss in the plurality of optical fibers can be suppressed more.

As one embodiment of the optical fiber bundle structure, a length of the first accommodating portion in an extending direction of the ferrule may be 2 mm or more. According to this configuration, the first diameter portion of each of the optical fibers is rigidly held by the first accommodating portion of the ferrule, and each of the optical fibers is hard to be slipped from the original position of the ferrule.

As one embodiment of the optical fiber bundle structure, a value obtained by dividing a difference between an outer diameter dimension of the second diameter portions and an outer diameter dimension of the first diameter portions by a length of the inner diameter transition portion in the extending direction of the ferrule may be 0.085 or less. According to this configuration, the curvature of the plurality of optical fibers can be reduced more, and bending loss and breakage risk of the plurality of optical fibers can be reduced more.

As one embodiment of the optical fiber bundle structure, the first diameter portions of the plurality of optical fibers may be arranged at a first pitch in the fiber accommodating portion when viewed in the first direction. At least a pair of the second diameter portions of the plurality of optical fibers may be arranged at a second pitch in the fiber accommodating portion when viewed in the first direction. The second pitch may be equal to or more than the outer diameter dimension of the second diameter portions of the plurality of optical fibers. According to this configuration, the curvature of the plurality of optical fibers can be reduced more, and bending loss and breakage risk of the plurality of optical fibers can be improved more.

As one embodiment of the optical fiber bundle structure, the second diameter portions of a first group of the plurality of optical fibers may be arranged at the second pitch in the fiber accommodating portion when viewed in the first direction. The second diameter portions of a second group of the plurality of optical fibers may be arranged at a third pitch in the fiber accommodating portion when viewed in the first direction. The third pitch may be larger than the second pitch. According to this configuration, the curvature of the plurality of optical fibers can be reduced more, and bending loss and breakage risk of the plurality of optical fibers can be improved more.

An optical connection structure according to the present disclosure includes: the optical fiber bundle; and a multicore fiber. The multicore fiber includes a plurality of cores extending in the first direction, and a cladding covering the plurality of cores. At least one of the plurality of cores included in the multicore fiber and at least one core of the plurality of optical fibers are optically coupled to each other. According to such a structure, the curvature of the optical fibers is reduced, and bending loss and breakage risk of the optical fibers can be improved. Therefore, bending loss in the optical connection can be reduced, and yield and production throughput can be improved while providing desirable performance.

A method of manufacturing an optical fiber bundle according to the present disclosure includes: preparing a ferrule and a plurality of optical fibers; inserting the plurality of optical fibers into the ferrule; and pulling the plurality of optical fibers back in an opposite direction in which the plurality of optical fibers are inserted. The ferrule is formed as a hollow shape with a circular cross-section, and extends in a first direction. The ferrule includes a fiber accommodating portion. The fiber accommodating portion includes a first accommodating portion, a second accommodating portion, and an inner diameter transition portion. The second accommodating portion has an inner diameter larger than of the first accommodating portion. The inner diameter transition portion locates between the first accommodating portion and the second accommodating portion through a tapered surface. Each of the plurality of the optical fibers includes a first diameter portion and a second diameter portion. The second diameter portion has a diameter larger than that of the first diameter portion. The plurality of optical fibers are inserted into the ferrule such that the first diameter portions of the plurality of optical fibers are inserted into the first accommodating portion. After the plurality of optical fibers are inserted into the ferrule, while maintaining a state where the plurality of optical fibers are located in the first accommodating portion, the plurality of optical fibers are pulled back in the opposite direction in which the plurality of optical fibers are inserted. In this case, the optical fiber bundle in which the curvature of the optical fibers is reduced can be manufactured. For this reason, bending loss and breakage risk of the optical fibers can be improved.

Details of Embodiment of Present Disclosure

Specific examples of an embodiment of the present disclosure will be described below with reference to the drawings. It is intended that the present invention is not limited to the examples, but is interpreted by the appended claims and includes all changes made within the concept and scope equivalent to the appended claims. In the description of the drawings, the same elements are denoted by the same reference signs, and a duplicated description will not be repeated.

Figure 2:
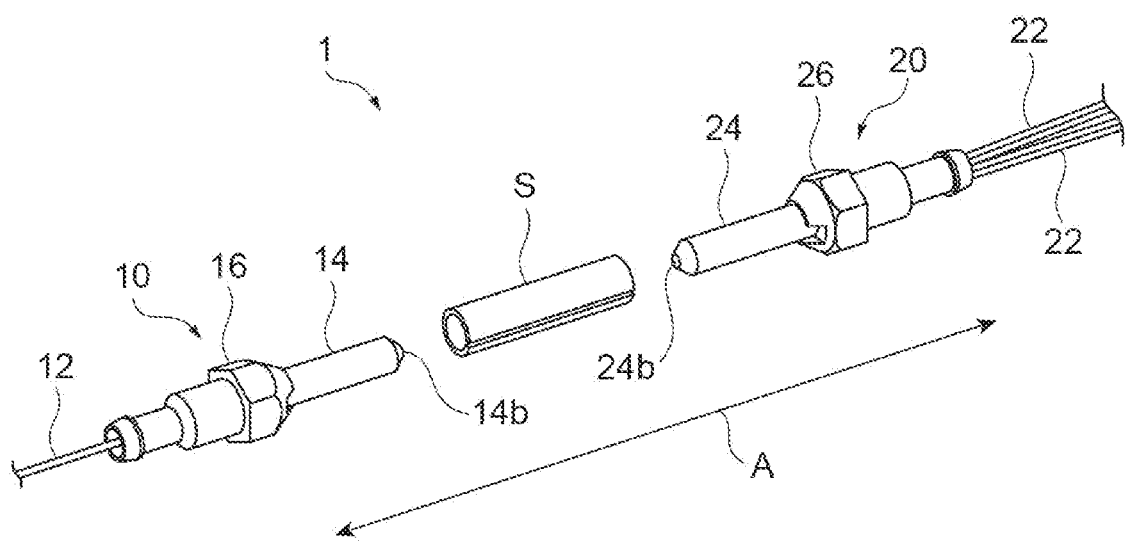
FIG. 2 is an exploded perspective view of the optical connection structure illustrated in FIG. 1.
Figure 3:
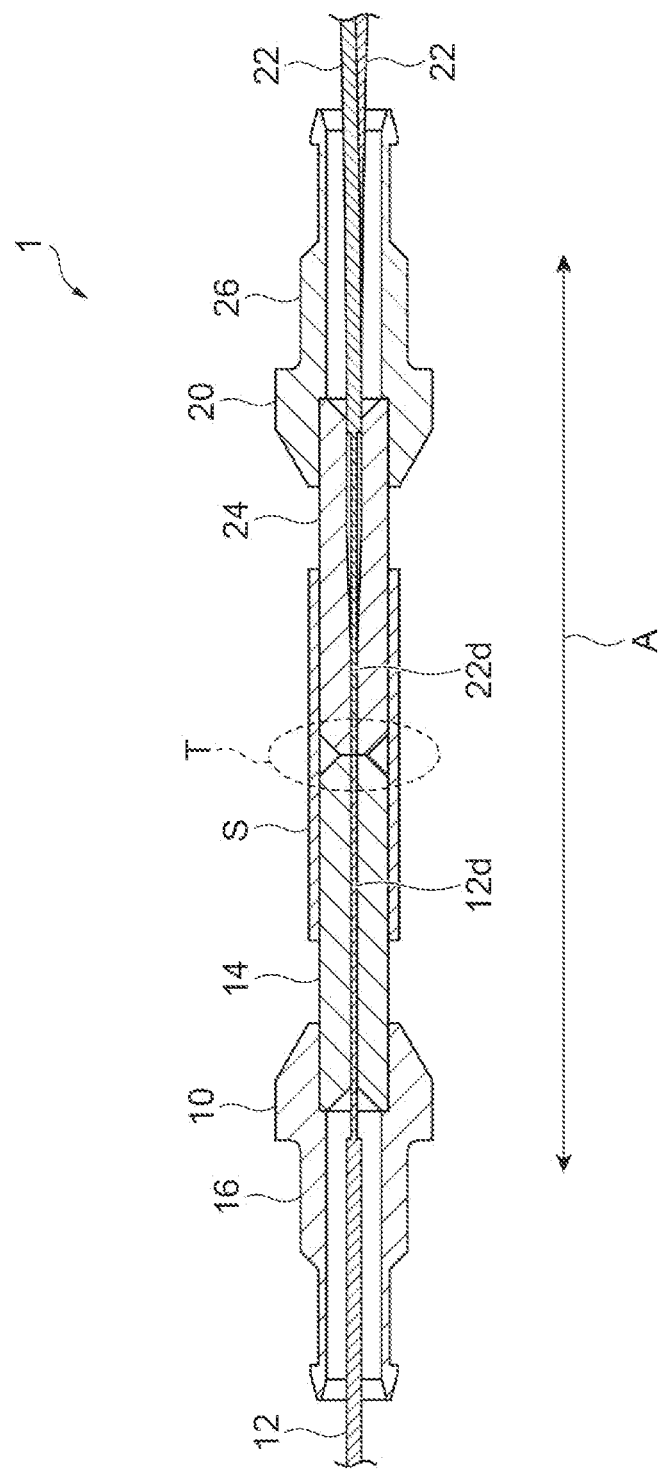
FIG. 3 is a cross-sectional view of the optical connection structure illustrated in FIG. 1 along the line III-III.

FIG. 1 is a perspective view illustrating an optical connection structure according to one embodiment. FIG. 2 is an exploded perspective view of the optical connection structure illustrated in FIG. 1. FIG. 3 is a cross-sectional view of the optical connection structure illustrated in FIG. 1 along the line III-III. As illustrated in FIGS. 1 to 3, an optical connection structure 1 includes a first optical fiber holder 10, a second optical fiber holder 20, and a split sleeve S. The first optical fiber holder 10 includes a multicore fiber 12 (hereinafter, also referred to as the "MCF 12"), a ferrule 14, and a flange 16. The second optical fiber holder 20 includes a plurality of optical fibers 22, a ferrule 24, a resin portion 25, and a flange 26. The second optical fiber holder 20 has an optical fiber bundle structure. The split sleeve S is a member that holds the ferrule 14 and the ferrule 24 from the outside and that aligns the centers of the ferrule 14 and the ferrule 24 with each other such that an optical axis of each core of the MCF 12 of the first optical fiber holder 10 and an optical axis of each core of the plurality of optical fibers 22 are aligned with each other.

Figure 4:
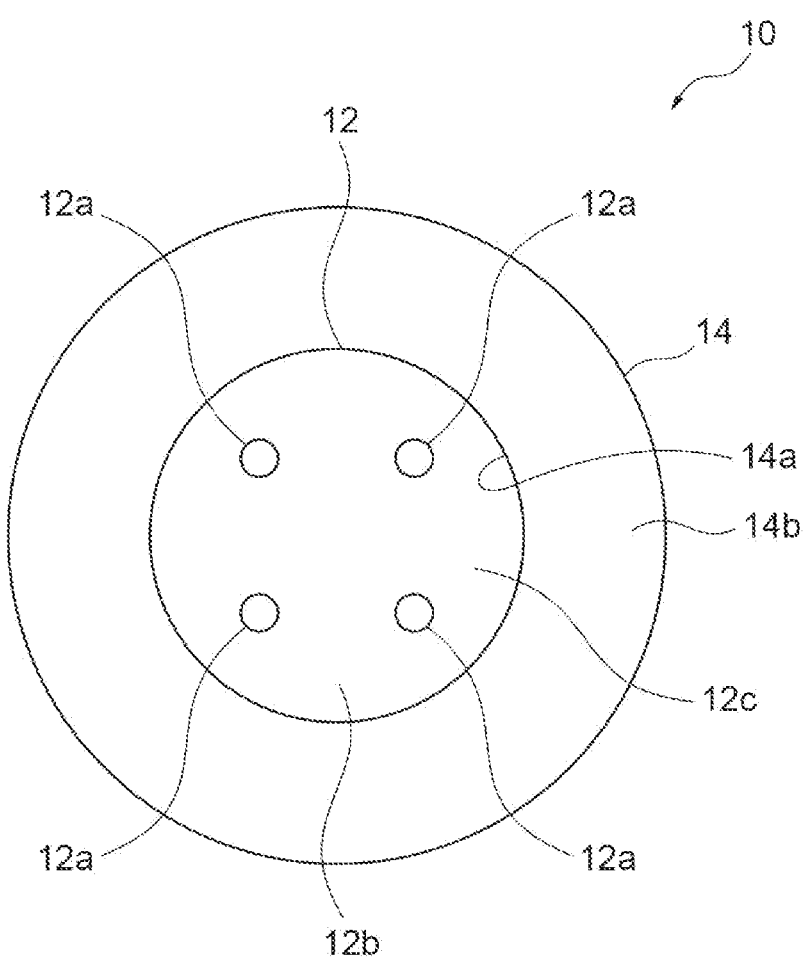
FIG. 4 is a view illustrating an end surface of a first optical fiber holder.

The MCF 12 extends in a direction A. Namely, the direction A corresponds to a longitudinal direction of the MCF 12. As illustrated in FIGS. 3 and 4, the MCF 12 includes a plurality of cores 12a extending in the direction A; a cladding 12b extending in the direction A and collectively covering the plurality of cores 12a; and a tip surface 12c. FIG. 4 is a view illustrating an end surface of the first optical fiber holder 10. FIG. 4 illustrates a tip of the MCF 12 and an end surface of the ferrule 14. The tip surface 12c is formed by tips of the plurality of cores 12a and a tip of the cladding 12b. The cores 12a are made of, for example, silica glass doped with a dopant such as germanium oxide to increase refractive index, the cladding 12b may be made of, for example, silica glass doped with a dopant such as fluoride to lower refractive index, and a combination of a material, a dopant, and the like can be appropriately selected. In the MCF 12, each of the cores 12a can propagate an optical signal of a predetermined wavelength.

In the MCF 12, for example, the cores 12a are two-dimensionally disposed. As illustrated in FIG. 4, the MCF 12 includes, for example, four cores 12a in one fiber. The number of the cores 12a in the MCF 12 is not limited to four. As a modification example of the present embodiment, the MCF 12 may include three cores 12a, seven cores 12a, eight cores 12a, or nineteen cores 12a. In the example illustrated in FIG. 4, the four cores 12a are disposed in a square shape. A mode field diameter of each of the cores 12a may be, for example, 15 μm or less or 5 μm or more. A core pitch of the cores 12a may be, for example, 20 μm or more and 80 μm or less. The "core pitch" corresponds to a distance between centers of the cores in a cross-section orthogonal to the direction A. A diameter of the cladding 12b may be, for example, 200 μm or less, 125 μm or less, 100 μm or less, 80 μm or less, or 50 μm or less.

The ferrule 14 is a cylindrical member that holds a tip portion 12d of the MCF 12, and has an inner hole 14a that is a through-hole that accommodates the tip portion 12d of the MCF 12, and an end surface 14b of the ferrule 14. The ferrule 14 fixes the tip portion 12d of the MCF 12 to the inner hole 14a such that the tip surface 12c of the MCF 12 is exposed inside the end surface 14b. An inner diameter of the inner hole 14a is a diameter that is the same as or slightly larger than an outer diameter of the MCF 12, and the tip portion 12d of the MCF 12 is fitted by being inserted into the inner hole 14a. A length of the ferrule 14 in the direction A is, for example, 6 mm or more and 11 mm or less. The ferrule 14 is made of a ceramic material such as zirconia or of a glass material.

As illustrated in FIG. 3, the flange 16 is a tubular member that holds a rear end portion of the ferrule 14 and that accommodates the MCF 12 there inside. A portion of the MCF 12 accommodated inside the flange 16 may be fixed inside the flange 16 by an adhesive agent or the like. The flange 16 is made of, for example, metal, resin, or the like.

Figure 5:
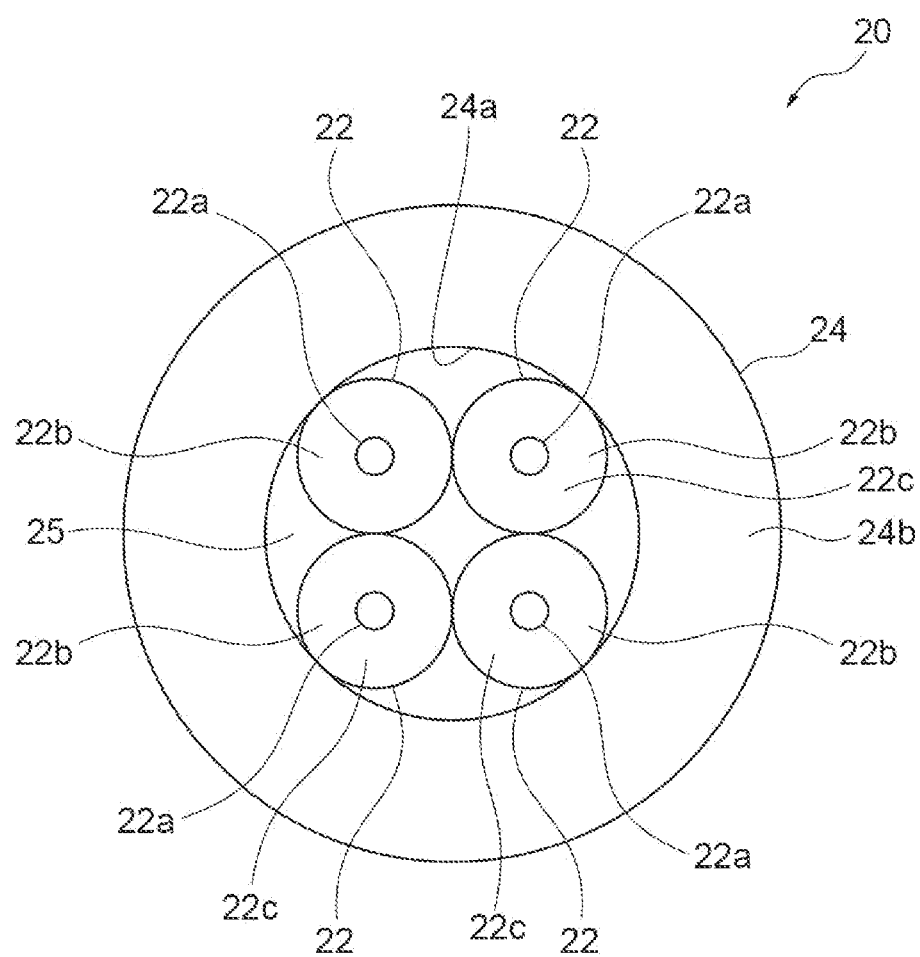
FIG. 5 is a view illustrating an end surface of a second optical fiber holder.

The plurality of optical fibers 22 are optical fibers that are optically connected to the MCF 12. As illustrated in FIGS. 3 and 5, each of the optical fibers 22 includes a core 22a extending in the direction A; a cladding 22b extending in the direction A and covering the core 22a; and a tip surface 22c. FIG. 5 is a view illustrating an end surface of the second optical fiber holder 20. FIG. 5 illustrates tips of the plurality of optical fibers 22 and an end surface of the ferrule 24. The tip surface 22c is formed by a tip of the core 22a and a tip of the cladding 22b. The core 22a is made of, for example, silica glass doped with a dopant such as germanium to increase refractive index, the cladding 22b may be made of, for example, silica glass doped with a dopant such as fluoride to lower refractive index, and a combination of a material, a dopant, and the like can be appropriately selected. In the optical fibers 22, each of the core 22a can propagate an optical signal of a predetermined wavelength. Each of the optical fibers 22 is a single-core optical fiber including one core. As a modification example of the present embodiment, each of the optical fibers 22 may have, for example, an optical fiber bundle structure including a multicore optical fiber, or a structure in which single-core optical fibers and multicore optical fibers are mixed.

Figure 6:
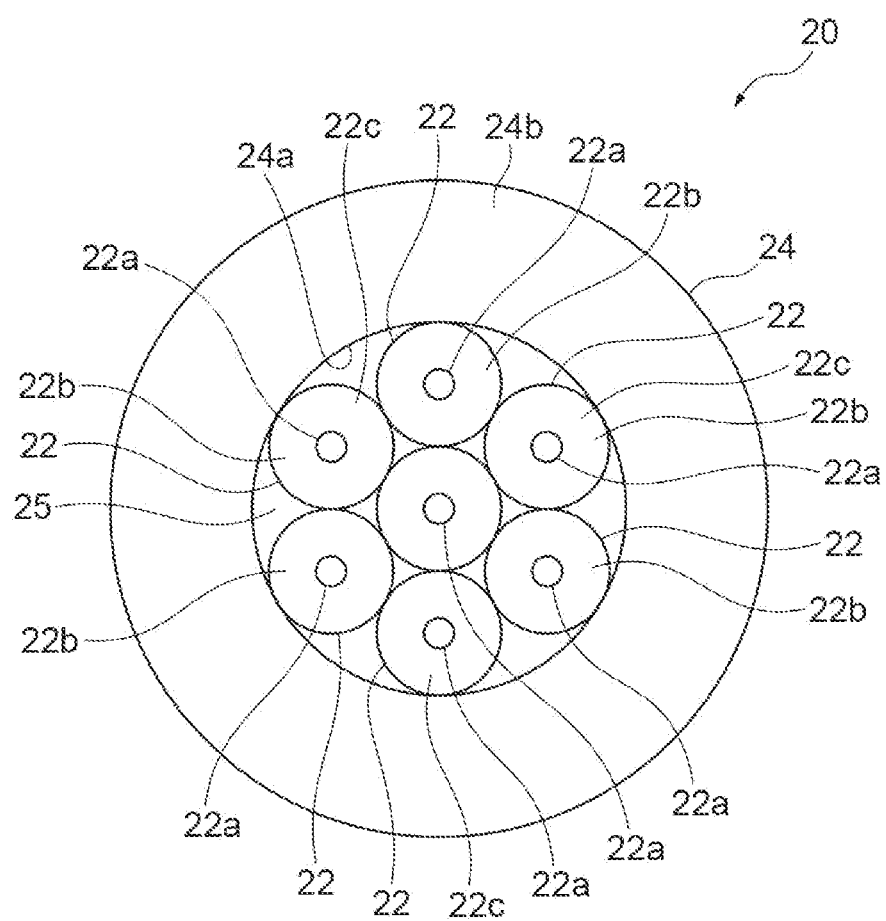
FIG. 6 is a view illustrating an end surface of a second optical fiber holder in a modification example of the embodiment.

In the second optical fiber holder 20, the optical fibers 22 are two-dimensionally disposed when viewed in the direction A. As illustrated in FIG. 5, the second optical fiber holder 20 includes, for example, four optical fibers 22. The number of the optical fibers 22 in the second optical fiber holder 20 is not limited to four. As a modification example of the present embodiment, as illustrated in FIG. 6, the second optical fiber holder 20 may include seven optical fibers 22. As a further modification example, the second optical fiber holder 20 may include three optical fibers 22, eight optical fibers 22, or nineteen optical fibers 22.

In the present embodiment, each of the optical fibers 22 is, for example, a single mode type of optical fiber. Each of the optical fibers 22 has a refractive index distribution profile of the step index type. As a modification example of the present embodiment, each of the optical fibers 22 includes layers between the core 22a and the cladding 22b, the layers having refractive index lower than that of the cladding 22b, that are called trench and inner cladding. As a modification example of the present embodiment, each of the optical fibers 22 may be, for example, a multimode type of optical fiber.

The number and disposition of the cores 22a of the optical fibers 22 of the second optical fiber holder 20 correspond to the number and disposition of the plurality of cores 12a of the MCF 12 of the first optical fiber holder 10. In other words, the disposition of the cores 22a of the plurality of optical fibers 22 coincides with the disposition of the plurality of cores 12a of the MCF 12. However, the total number and disposition of the cores 22a of the plurality of optical fibers 22 do not need to completely coincide with those of the MCF 12, and some cores 22a and some cores 12a may be configured not to be optically connected to each other. The cores 22a of the plurality of optical fibers 22 of the second optical fiber holder 20 are configured to be optically coupled to the respective cores 12a of the MCF 12 of the first optical fiber holder 10 by rotational adjustment around a central axis of the ferrule 24.

In the optical connection structure 1, at least one of the plurality of cores 12a included in the MCF 12 is optically coupled to at least one core 22a of the plurality of optical fibers 22. For example, when each of the optical fibers 22 is a single mode type of single-core optical fiber, the cores 22a of the optical fibers 22 correspond in one-to-one to the cores 12a of the MCF 12 of the first optical fiber holder 10. For example, when the optical fiber 22 is a multicore optical fiber, a plurality of the cores 22a of one optical fiber 22 correspond to the plurality of cores 12a of the MCF 12 of the first optical fiber holder 10.

Each of the optical fibers 22 is configured to have an optical loss of 0.15 dB or less, for example, when light having a wavelength of 1.550 μm enters into the optical fibers 22 having one turn with a radius of 5 mm or less. Each of the optical fibers 22 is configured to have an optical loss of 0.45 dB or less, for example, when light having a wavelength of 1.625 μm enters into the optical fibers 22 having one turn with a radius of 5 mm or less. Each of the optical fibers 22 may have both the above characteristic for the light having a wavelength of 1.550 μm and the light having 1.625 μm or may have one of them.

The ferrule 24 is a cylindrical member that collectively holds tip portions 22d of the plurality of optical fibers 22, and includes an inner hole 24a that is a through-hole that accommodates the tip portions 22d of the plurality of optical fibers 22, and an end surface 24b. The ferrule 24 is made of, for example, a ceramic material such as zirconia or of a glass material.

In the ferrule 24, the tip portions 22d of the plurality of optical fibers 22 are fixed in the inner hole 24a by the resin portion 25 such that each of the tip surfaces 22c of the plurality of optical fibers 22 is exposed inside the end surface 24b of the ferrule 24. An inner diameter of the inner hole 24a has a diameter that is the same as or slightly larger than that of a bundle of the plurality of optical fibers 22, and the tip portions 22d of the plurality of optical fibers 22 are inserted into the inner hole 24a, and are adhesively fixed by the resin portion 25 with which a gap between the tip portions 22d and the inner hole 24a is filled.

The resin 25 is, for example, an adhesive agent to fix fibers. The resin 25 is, for example, a thermosetting adhesive agent, and after the resin 25 is injected into a predetermined location, the resin 25 can be cured by heating. When the ferrule 24 made of mainly a ceramic material is used, the resin 25 is, for example, a thermosetting epoxy-based adhesive agent or a thermosetting acrylic-based adhesive agent. When the ferrule 24 made of mainly a glass material which is transparent to ultraviolet light is used, the resin 25 is, for example, a thermosetting epoxy-based adhesive agent, a thermosetting acrylic-based adhesive agent, an ultraviolet-curable epoxy-based adhesive agent, or an ultraviolet-curable acrylic-based adhesive agent. The resin 25 is not limited to the above adhesive agents regardless of the material of the ferrule 24.

As illustrated in FIG. 3, the flange 26 is a tubular member that holds a rear end portion of the ferrule 24 and that accommodates the plurality of optical fibers 22 inside. In other words, the flange 26 is a holder of ferrule 24. The plurality of optical fibers 22 accommodated inside the flange 26 may be fixed inside the flange 26 by an adhesive agent or the like. The flange 26 is made of, for example, metal, resin, or the like.

Figure 7:
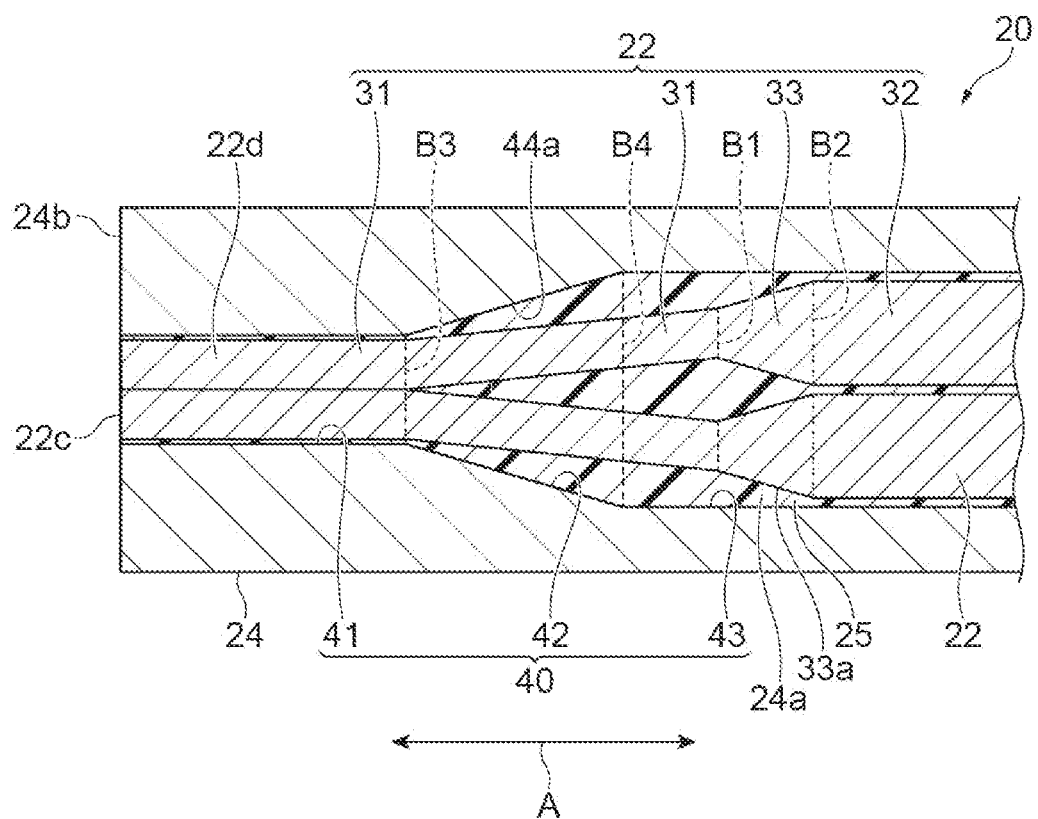
FIG. 7 is a partial enlarged view illustrating a cross-section of a tip portion of the second optical fiber holder along a longitudinal direction.
Figure 8:
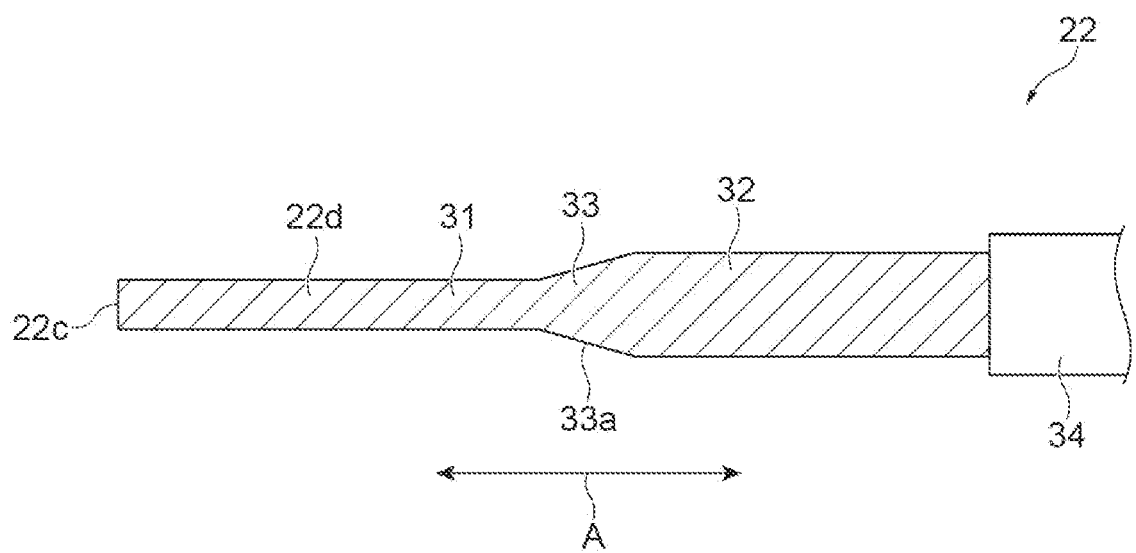
FIG. 8 is a partial enlarged view illustrating a tip portion of an optical fiber.
Figure 9:
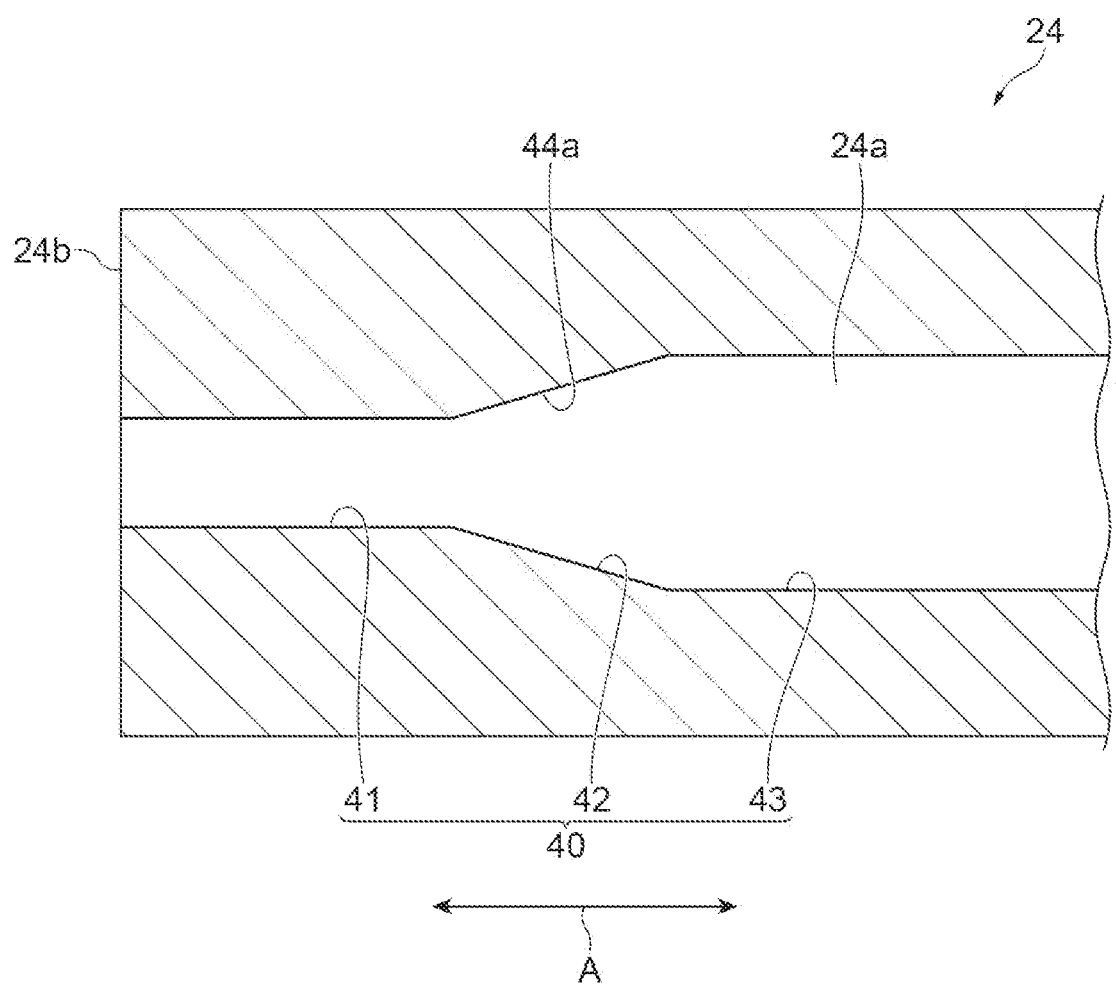
FIG. 9 is a partial enlarged view illustrating a cross-section in a first direction of a tip portion of a ferrule.

Next, one example of the second optical fiber holder 20 in the present embodiment will be described in further detail with reference to FIGS. 5, and 7 to 9. FIG. 7 illustrates is a cross-section of a tip portion of the second optical fiber holder 20 along the direction A. FIG. 8 illustrates a tip portion of the optical fiber 22. FIG. 9 illustrates is a cross-section of a tip portion of the ferrule 24 along the direction A.

As illustrated in FIGS. 7 and 8, each of the plurality of the optical fibers 22 includes a first diameter portion 31, a second diameter portion 32, and a tapered portion 33. In FIG. 7, two broken lines illustrated on each of the optical fibers 22 indicate a boundary B1 between the first diameter portion 31 and the tapered portion 33 and a boundary B2 between the second diameter portion 32 and the tapered portion 33, respectively. The first diameter portion 31 is a small-diameter optical fiber portion, and has a diameter smaller than a standard optical fiber outer diameter. The first diameter portion 31 is formed, for example, by a diameter reduction process using etching treatment with buffered hydrofluoric acid liquid or the like. The second diameter portion 32 is a portion having a standard optical fiber outer diameter. In other words, the second diameter portion 32 has a diameter larger than that of the first diameter portion 31. The tapered portion 33 includes a tapered surface 33a. The tapered portion 33 locates between the first diameter portion 31 and the second diameter portion 32 through the tapered surface 33a.

The diameter of the first diameter portion 31 is, for example, 20 μm or more and 80 μm or less. In the configuration illustrated in FIG. 8, the diameter of the first diameter portion 31 is 40 μm. The diameter of the second diameter portion 32 is, for example, 50 μm or more and 200 μm or less. In the configuration illustrated in FIG. 8, the diameter of the second diameter portion 32 is 125 μm.

Each of the optical fibers 22 further includes a coating portion 34. The coating portion 34 covers a portion having the same diameter as that of the second diameter portion 32, along an outer shape of the optical fibers 22. The coating portion 34 has a diameter larger than that of the second diameter portion 32. The diameter of the coating portion 34 is, for example, 170 μm or more and 260 μm or less. In the configuration illustrated in FIG. 8, the diameter of the coating portion 34 is 250 µm.

As illustrated in FIG. 5, The inner hole 24a is two-dimensionally and densely filled with the plurality of optical fibers 22 on the tip surfaces 22c. "Two-dimensional dense filling" means that a maximum number of the optical fibers 22 that can be disposed in the inner hole 24a are disposed such that each of the optical fibers 22 does not have enough clearance to move in the inner hole 24a before fixed. For example, the plurality of optical fibers 22 are disposed in contact with each other in the inner hole 24a of the ferrule 24. A clearance may be provided between the plurality of optical fibers 22 and the inner hole 24a. When the diameter of each of four first diameter portions 31 on the tip surface 22c is 40 µm and the inner diameter of the inner hole 24a is 96.6 µm, the clearance between the plurality of optical fibers 22 and the inner hole 24a is zero.

A mode field diameter of each of the cores 22a is, for example, 15 µm or less. The mode field diameter of each of the cores 22a may be, for example, 5 µm or more at the wavelength for optical communication such as 1.31 and 1.55 µm. A core pitch of the cores 22a on the tip surfaces 22c is, for example, 20 µm or more and 80 µm or less. A diameter of each of the claddings 22b on the tip surface 22c is, for example, 20 µm or more and 125 µm or less. The inner diameter of the inner hole 24a of the ferrule 24 is, for example, 200 µm or less. The diameter of the circumscribed circle may be, for example, 125 µm or less, 100 µm or less, 80 µm or less, or 50 µm or less.

The ferrule 24 includes a fiber accommodating portion 40. The fiber accommodating portion 40 is filled with the resin 25. The fiber accommodating portion 40 is formed as a hollow shape with a circular in cross-section, and extends in the direction A. The fiber accommodating portion 40 corresponds to the inner hole 24a described above. The plurality of optical fibers 22 are kept in the fiber accommodating portion 40.

As illustrated in FIGS. 7 and 9, the fiber accommodating portion 40 includes a first accommodating portion 41, an inner diameter transition portion 42, and a second accommodating portion 43. In FIG. 7, two broken lines illustrated on the ferrule 24 indicate a boundary B3 between the first accommodating portion 41 and the inner diameter transition portion 42 and a boundary B4 between the inner diameter transition portion 42 and the second accommodating portion 43, respectively. The second accommodating portion 43 has an inner diameter larger than that of the first accommodating portion 41. The inner diameter transition portion 42 has a tapered shape. The inner diameter transition portion 42 locates between the first accommodating portion 41 and the second accommodating portion 43 through a tapered surface. The inner diameter transition portion 42 may connect the first accommodating portion 41 and the second accommodating portion 43 through a curved surface.

The first diameter portion 31 of each of the optical fibers 22 is located in the first accommodating portion 41, in the inner diameter transition portion 42, and in the second accommodating portion 43. The second diameter portion 32 of each of the optical fibers 22 is located only in the second accommodating portion 43 not located in the first accommodating portion 41 and in the inner diameter transition portion 42. The entirety of the tapered portion 33 of each of the optical fibers 22 is located in the second accommodating portion 43. Each of the optical fibers 22 is separated from an inner surface 44a of the ferrule 24 in the inner diameter transition portion 42. The inner surface 44a is a surface defining the inner hole 24a.

A length of the ferrule 24 in the direction A is, for example, 6 mm or more and 11 mm or less. The ferrule 24 is made of a ceramic material such as zirconia or of a glass material. In the configuration illustrated in FIG. 9, the length of the ferrule 24 in the direction A is 6.5 mm. A length of the first accommodating portion 41 in the direction A, namely, an extending direction of the ferrule 24 is, for example, 2 mm or more. A length of the inner diameter transition portion 42 in the extending direction of the ferrule 24 is, for example, 1 mm or more. A length of the inner diameter transition portion 42 in the extending direction of the ferrule 24 is, for example, 2 mm or more. A connection portion between the first diameter portion 31 and the second diameter portion 32 of each of the optical fibers 22 is separated from the boundary B4 between the inner diameter transition portion 42 and the second accommodating portion 43 in the direction A by 0.5 mm or more. The boundary B1 between the first diameter portion 31 and the tapered portion 33 of each of the optical fibers 22 is separated from the boundary B4 between the inner diameter transition portion 42 and the second accommodating portion 43 in the direction A by 0.5 mm or more.

When viewed in the direction A, the first diameter portions 31 of the plurality of optical fibers 22 are arranged at a first pitch in the fiber accommodating portion 40. The first pitch is, for example, the core pitch of the cores 22a in the first diameter portions 31. When viewed in the direction A, the second diameter portions 32 of the plurality of optical fibers 22 are arranged at a second pitch in the fiber accommodating portion 40. The second pitch is, for example, the core pitch of the cores 22a in the second diameter portions 32.

When the first diameter portions 31 of the optical fibers 22 adjacent to each other are in contact with each other, the first pitch is equal to an outer diameter dimension of the first diameter portions 31. When the first diameter portions 31 of the optical fibers 22 adjacent to each other are not in contact with each other, the first pitch is larger than the outer diameter dimension of the first diameter portions 31. Similarly, when the second diameter portions 32 of the optical fibers 22 adjacent to each other are in contact with each other, the second pitch is equal to an outer diameter dimension of the second diameter portions 32. When the second diameter portions 32 of the optical fibers 22 adjacent to each other are not in contact with each other, the second pitch is larger than the outer diameter dimension of the second diameter portions 32.

When a clearance is provided between the plurality of optical fibers 22 and the inner hole 24a, a pitch at which the optical fibers 22 are arranged can be changed within the range of the clearance. A clearance between the first diameter portions 31 of the plurality of the optical fibers 22 and the inner hole 24a of the first accommodating portion 41 is smaller than a clearance between the second diameter portions 32 of the plurality of the optical fibers 22 and the inner hole 24a of the second accommodating portion 43. The clearance between the first diameter portions 31 of the plurality of the optical fibers 22 and the inner hole 24a of the first accommodating portion 41 is almost zero. For example, when the diameter of each of the four first diameter portions 31 on the tip surface 22c is 40 µm, the inner diameter of the inner hole 24a of the first accommodating portion 41 is configured to be approximately 97 µm. When the diameter of each of four second diameter portions 32 is 125 µm, the inner diameter of the inner hole 24a of the second accommodating portion 43 is configured to be approximately 310 µm or more and 400 µm or less.

The second diameter portions 32 can be located apart in the second accommodating portion 43 by the clearance between the second diameter portions 32 of the plurality of optical fibers 22 and the inner hole 24a of the second accommodating portion 43. For this reason, when viewed in the direction A, at least a pair of the second diameter portions 32 of the plurality of optical fibers 22 may be arranged at a pitch of equal to or more than the outer diameter dimension of the second diameter portions 32 in the fiber accommodating portion 40. There can be a case where a pitch at which the second diameter portions 32 of a first group of the plurality of optical fibers 22 are arranged is larger than a pitch at which the second diameter portions 32 of a second group of the plurality of optical fibers 22 are arranged. The first group and the second group are groups formed by different combinations of a plurality of the second diameter portions 32. The first group and the second group may include the same second diameter portion 32. For example, the second diameter portions 32 of the first group adjacent to each other are in contact with each other, and the second diameter portions 32 of the second group adjacent to each other are separated from each other.

When a value obtained by dividing a difference between the outer diameter dimension of the second diameter portions 32 of the plurality of optical fibers 22 and the outer diameter dimension of the first diameter portions 31 of the plurality of optical fibers 22 by the length of the inner diameter transition portion 42 in the direction A is defined as a "transition ratio", the transition ratio is, for example, 0.085 or less. When the transition ratio is 0.085 or less, the risk of breakage or damage of the optical fibers 22 decreases more than when the transition ratio is larger than 0.085. The transition ratio is more preferably 0.070 or less. When the transition ratio is 0.070 or less, the risk of breakage or damage of the optical fibers 22 decreases more remarkably than when the transition ratio is 0.070 or more.

For example, in the configuration illustrated in FIGS. 5 and 7, the outer diameter dimension of the first diameter portions 31 is 40 µm, and the outer diameter dimension of the second diameter portions 32 is 125 µm. In this case, a difference between the outer diameter dimension of the first diameter portions 31 and the outer diameter dimension of the second diameter portions 32 is 85 µm. When the length of the inner diameter transition portion 42 in the extending direction of the ferrule 24 is 1 mm, namely, 1000 µm, the transition ratio is 0.085. In other words, when the transition ratio is 0.085, the outer diameter dimension of the first diameter portions 31 is 30 µm, and the outer diameter dimension of the second diameter portions 32 is 125 µm, the length of the inner diameter transition portion 42 in the extending direction of the ferrule 24 is 1.1 mm.

The second optical fiber holder 20 described above is manufactured, for example, by the following steps. First, the ferrule 24 and the plurality of optical fibers 22 are prepared.

Next, the plurality of optical fibers 22 are inserted into the ferrule 24 such that the first diameter portions 31 of the plurality of optical fibers 22 are inserted into the first accommodating portion 41 of the ferrule 24. An inserting-in direction is along the direction A. At this time, the first diameter portion 31 of each of the optical fibers 22 is inserted into the first accommodating portion 41, and each of the optical fibers 22 is exposed from the end surface 24b of the ferrule 24. In this state, for example, the tapered portion 33 of at least one optical fiber 22 is located in the inner diameter transition portion 42 of the ferrule 24.

Next, after the plurality of optical fibers 22 are inserted into the ferrule 24, while maintaining a state where the first diameter portions 31 of the plurality of optical fibers 22 are located in the first accommodating portion 41, the plurality of optical fibers 22 are pulled back in an opposite direction in which the plurality of optical fibers 22 are inserted. Too much bending of the plurality of optical fibers 22 are improved by pulling the plurality of optical fibers 22 back. By pulling the plurality of optical fibers 22 back, the first diameter portion 31 of each of the optical fibers 22 is located in the first accommodating portion 41, in the inner diameter transition portion 42, and in the second accommodating portion 43, and each of the optical fibers 22 is separated from the inner surface 44a of the ferrule 24 in the inner diameter transition portion 42. For example, the plurality of optical fibers 22 are pulled back such that a boundary between the first diameter portion 31 and the tapered portion 33 of each of the optical fibers 22 is separated from the boundary between the inner diameter transition portion 42 and the second accommodating portion 43 in the direction A by 0.5 mm or more.

Next, the fiber accommodating portion 40 is filled with the resin 25, and the resin 25 is cured. As a result, each of the optical fibers 22 is fixed to the ferrule 24. The second optical fiber holder 20 assembly is completed by the above steps.

Figure 10:
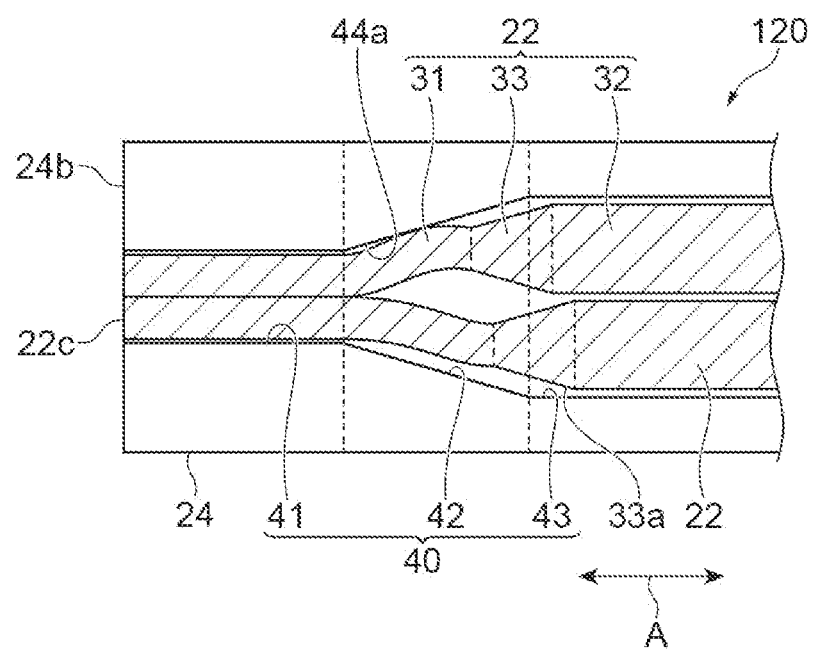
FIG. 10 is a partial enlarged view illustrating a cross-section of a tip portion of a second optical fiber holder in a first comparative example.
Figure 11:
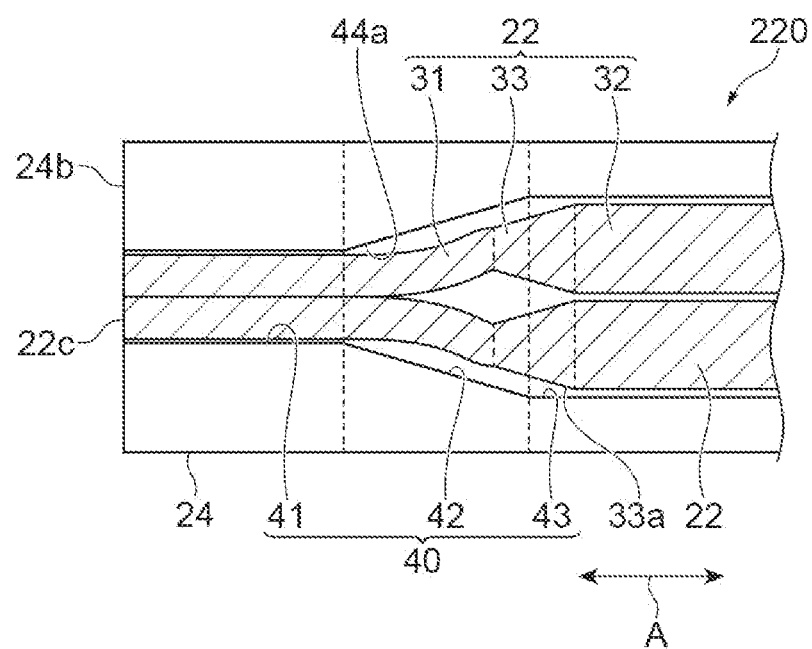
FIG. 11 is a partial enlarged view illustrating a cross-section of a tip portion of a second optical fiber holder in a second comparative example.

FIGS. 10 and 11 illustrate second optical fiber holders 120 and 220 as first and second comparative examples, respectively. In FIGS. 10 and 11, portions of the resin 25 and the ferrule 24 are not hatched.

In the second optical fiber holders 20, 120, and 220, the first diameter portion 31 is reduced in diameter, and strength of the first diameter portion 31 is lower than the portion with the second diameter. Particularly, when the optical fiber 22 is bent, a stress is likely to concentrate on the connection portion between the first diameter portion 31 that is reduced in diameter and the second diameter portion 32 that is not reduced in diameter. The connection portion may break due to the concentrated stress. In addition, since the first diameter portion 31 that is reduced in diameter has a thin cladding, light in the core 22a is likely to leak when the first diameter portion 31 is curved as illustrated in FIG. 10 or 11. In FIG. 10, the first diameter portion 31 of the second optical fiber holder 120 is curved and is in contact with the inner surface 44a of the ferrule 24 in the inner diameter transition portion 42. In FIG. 11, the first diameter portion 31 of the second optical fiber holder 220 is curved and is in contact with the first diameter portion 31 of the adjacent optical fiber 22 in the inner diameter transition portion 42.

For example, if the clearance between the plurality of optical fibers 22 and the inner hole 24a is relatively small, friction occurs when the first diameter portions 31 of the plurality of optical fibers 22 are inserted into the first accommodating portion 41. For this reason, as illustrated in FIGS. 10 and 11, when the first diameter portions 31 of the plurality of optical fibers 22 are inserted into the first accommodating portion 41, the first diameter portions 31 may be curved.

In the second optical fiber holder 20, each of the first diameter portions 31 is located in the first accommodating portion 41, in the inner diameter transition portion 42, and in the second accommodating portion 43. Each of the optical fibers 22 is separated from the inner surface 44a of the ferrule 24 in the inner diameter transition portion 42. According to such a structure, the curvature of the optical fibers 22 is reduced, and bending loss and breakage risk of the optical fibers 22 are improved. Therefore, yield and production throughput can be improved while providing desirable performance.

In the second optical fiber holder 20, each of the optical fibers 22 is configured to have an optical loss of 0.15 dB or less when light having a wavelength of 1.550 μm enters into the optical fibers 22 having one turn with a radius of 5 mm or less. In this case, bending loss in the plurality of optical fibers 22 can be reduced more.

In the second optical fiber holder 20, each of the optical fibers 22 is configured to have an optical loss of 0.45 dB or less when light having a wavelength of 1.625 μm enters into the optical fibers 22 having one turn with a radius curvature of 5 mm or less. In this case, bending loss in the plurality of optical fibers 22 can be reduced more.

The smaller the length of the first accommodating portion 41 is, the smaller an adhesive strength of the resin portion 25 between the first diameter portions 31 of the plurality of optical fibers 22 and the inner surface 44a in the first accommodating portion 41 is. The resin portion 25 expands or shrinkage according to a change in environmental temperature or humidity or the like. For this reason, the positions of the optical fibers 22 with respect to the ferrule 24 may be changed from original one due to the expansion and contraction of the resin portion 25.

In the second optical fiber holder 20, the length of the first accommodating portion 41 in the extending direction of the ferrule 24 is 2 mm or more. Since a gap between the first accommodating portion 41 and the optical fibers 22 is relatively small, the influence of the expansion and shrinkage of the resin portion 25 is reduced. Therefore, according to this configuration, the first diameter portion 31 of each of the optical fibers 22 is rigidly held by the first accommodating portion 41 of the ferrule 24, and each of the optical fibers 22 is hard to be slipped from the original position of the ferrule 24. Further, the longer the first accommodating portion 41 is, the more the positional accuracy of the tip surface 22c of each of the optical fibers 22 with respect to the ferrule 24 can be improved.

In the second optical fiber holder 20, the value obtained by dividing the difference between the outer diameter dimension of the second diameter portions 32 of the plurality of optical fibers 22 and the outer diameter dimension of the first diameter portions 31 of the plurality of optical fibers 22 by the length of the inner diameter transition portion 42 in the extending direction of the ferrule 24 is 0.085 or less. According to this configuration, the curvature of the plurality of optical fibers 22 can be reduced more, and bending loss and breakage risk of the plurality of optical fibers 22 can be reduced more as well. The length of the inner diameter transition portion 42 in the direction A is, for example, 1 mm or more.

In the second optical fiber holder 20, the first diameter portions 31 of the plurality of optical fibers 22 are arranged at the first pitch in the fiber accommodating portion 40 when viewed in the direction A, and at least a pair of the second diameter portions 32 of the plurality of optical fibers 22 are arranged at the second pitch in the fiber accommodating portion 40 when viewed in the direction A. The second pitch is equal to or more than the outer diameter dimension of the second diameter portions 32. According to this configuration, the curvature of the plurality of optical fibers 22 can be reduced more, and bending loss and breakage risk of the plurality of optical fibers 22 can be improved more.

In the second optical fiber holder 20, the pitch at which the second diameter portions 32 of the first group of the plurality of optical fibers 22 are arranged is larger than the pitch at which the second diameter portions 32 of the second group of the plurality of optical fibers 22 are arranged. According to this configuration, the curvature of the plurality of optical fibers 22 can be reduced more, and bending loss and breakage risk of the plurality of optical fibers 22 can be improved more.

The embodiment of the present disclosure has been described above in detail, but the present invention is not limited to the embodiment and can be applied to various embodiments.

What is claimed is:

1. An optical fiber bundle structure comprising:
   a ferrule including a fiber accommodating portion that is formed as a hollow shape with a circular in cross-section and that extends in a first direction; and
   a plurality of optical fibers kept in the fiber accommodating portion,
   wherein each of the optical fibers includes a first diameter portion and a second diameter portion having a diameter larger than that of the first diameter portion,
   the fiber accommodating portion includes a first accommodating portion, a second accommodating portion having an inner diameter larger than that of the first accommodating portion, and an inner diameter transition portion connecting the first accommodating portion and the second accommodating portion through a tapered surface,
   the first diameter portion of each of the optical fibers is located in the first accommodating portion, in the inner diameter transition portion, and in the second accommodating portion,
   each of the optical fibers is separated from an inner surface of the ferrule in the inner diameter transition portion, and
   a value obtained by dividing a difference between an outer diameter dimension of the second diameter portions of the plurality of optical fibers and an outer diameter dimension of the first diameter portions of the plurality of optical fibers by a length of the inner diameter transition portion in the first direction is 0.085 or less.

2. The optical fiber bundle structure according to claim 1, wherein each of the optical fibers is configured to have an optical loss of 0.15 dB or less when light having a wavelength of 1.550 μm enters into the optical fibers having one turn with a radius curvature of 5 mm or less.

3. The optical fiber bundle structure according to claim 1, wherein each of the optical fibers is configured to have an optical loss of 0.45 dB or less when light having a wavelength of 1.625 μm enters into the optical fibers having one turn with a radius curvature of 5 mm or less.

4. The optical fiber bundle structure according to claim 1, wherein a length of the first accommodating portion in an extending direction of the ferrule is 2 mm or more.

5. The optical fiber bundle structure according to claim 1, wherein the first diameter portions of the plurality of optical fibers are arranged at a first pitch in the fiber accommodating portion when viewed in the first direction,
   at least a pair of the second diameter portions of the plurality of optical fibers are arranged at a second pitch in the fiber accommodating portion when viewed in the first direction, and
   the second pitch is equal to or more than the outer diameter dimension of the second diameter portions.

6. The optical fiber bundle structure according to claim 5, wherein a pitch at which the second diameter portions of a first group of the plurality of optical fibers are arranged is larger than that at which the second diameter portions of a second group of the plurality of optical fibers are arranged.

7. An optical connection structure comprising:

the optical fiber bundle structure according to claim 1; and a multicore fiber including a plurality of cores extending in the first direction, and a cladding covering the plurality of cores, wherein at least one of the plurality of cores included in the multicore fiber and at least one core of the plurality of optical fibers are optically coupled to each other.

8. A method of manufacturing an optical fiber bundle comprising:

preparing a ferrule formed as a hollow shape with a circular in cross-section, extending in a first direction, and including a fiber accommodating portion, and a plurality of optical fibers each including a first diameter portion and a second diameter portion having a diameter larger than that of the first diameter portion, the fiber accommodating portion including a first accommodating portion, a second accommodating portion having an inner diameter larger than that of the first accommodating portion, and an inner diameter transition portion connecting the first accommodating portion and the second accommodating portion through a tapered surface;

inserting the plurality of optical fibers into the ferrule such that the first diameter portions of the plurality of optical fibers are inserted into the first accommodating portion; and pulling the plurality of optical fibers back in an opposite direction in which the plurality of optical fibers are inserted while maintaining a state where the plurality of optical fibers are located in the first accommodating portion, after inserting the plurality of optical fibers into the ferrule, wherein a value obtained by dividing a difference between an outer diameter dimension of the second diameter portions of the plurality of optical fibers and an outer diameter dimension of the first diameter portions of the plurality of optical fibers by a length of the inner diameter transition portion in the first direction is 0.085 or less.

* * * * *

UNITED STATES PATENT AND TRADEMARK OFFICE
CERTIFICATE OF CORRECTION

| | |
|---|---|
| PATENT NO. | : 12,298,571 B2 |
| APPLICATION NO. | : 17/984576 |
| DATED | : May 13, 2025 |
| INVENTOR(S) | : Osamu Shimakawa |

It is certified that error appears in the above-identified patent and that said Letters Patent is hereby corrected as shown below:

On the Title Page

Please insert the following:
--(30) Foreign Application Priority Data
Dec. 3, 2021 (JP) 2021-196798--

Signed and Sealed this
Twenty-second Day of July, 2025

Coke Morgan Stewart
*Acting Director of the United States Patent and Trademark Office*